United States Patent
Caille et al.

(10) Patent No.: US 6,281,853 B1
(45) Date of Patent: Aug. 28, 2001

(54) TERMINAL-ANTENNA DEVICE FOR MOVING SATELLITE CONSTELLATION

(75) Inventors: Gérard Caille, Tournefeuille; Béatrice Pinte, Labege, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/403,987

(22) PCT Filed: Apr. 9, 1998

(86) PCT No.: PCT/FR98/00720

§ 371 Date: Oct. 29, 1999

§ 102(e) Date: Oct. 29, 1999

(87) PCT Pub. No.: WO98/49746

PCT Pub. Date: Nov. 5, 1998

(30) Foreign Application Priority Data

Apr. 30, 1997 (FR) .................................................. 97 05407
Aug. 1, 1997 (FR) .................................................. 97 09900

(51) Int. Cl.[7] .................................................. H01Q 19/06
(52) U.S. Cl. .......................... 343/754; 343/753; 343/909
(58) Field of Search .................................... 343/756, 753, 343/754, 755, 757, 909, 911 R, 911 L; H01Q 19/06

(56) References Cited

U.S. PATENT DOCUMENTS

| 3,953,858 | * | 4/1976 | Ohm | 343/781 |
| 4,044,361 | * | 8/1977 | Yokoi et al. | 343/754 |
| 4,199,257 | * | 4/1980 | Dosch et al. | 356/252 |
| 5,181,036 | * | 1/1993 | Miller et al. | 342/15 |
| 5,712,877 | | 1/1998 | Ho et al. | 375/284 |
| 6,057,797 | * | 5/2000 | Wagner | 342/70 |

FOREIGN PATENT DOCUMENTS 0 579 407 A1   1/1994  (EP) .
0 707 356 A1   4/1996  (EP) .
WO 88/09066    11/1988 (WO) .

OTHER PUBLICATIONS

Abeta: "Performance comparison between time–multiplexed pilot channel and parallel pilot channel for coherent rake combining in DS–CDMA modile radio" IEICE Transactions on Communications, vol. E81–B, No. 7, Jul. 1998, pp. 1417–1425, XP000790175, Tokyo, JP.

Andoh, et al.: "Channel estimation using time multiplexed pilot symbols for coherent Rake combining for DS–CDMA mobile radio" International Symposium on Personal Indoor and Mobile Radio Communications, Sep. 1–4, 1997, pp. 954–958, XP002135366, New York, US.

Andoh et al.: "Channel estimation filter using time–multiplexed pilot channel for coherent Rake combining in DS–CDMA mobile radio" IEICE Transactions on Communications, vol. E81–B, No. 7, Jul. 1998, pp. 1517–1525, XP000790186, Tokyo, JP.

Jindong Lin et al.: "An optimal windowed recursive least squares algorithm for fading channel estimation" International Symposium on Circuits and Systems, May 3–6, 1993, pp. 734–737, XP000410103, New York, US.

(List continued on next page.)

Primary Examiner—Tho Phan
(74) Attorney, Agent, or Firm—Sughrue, Mion, Zinn, Macpeak & Seas, PLLC

(57) ABSTRACT

A terminal and antenna system (1, 10) for transmitting and receiving radio signals to and from satellites (2, 3) chosen from a constellation of non-geostationary satellites, including means for determining the position of the satellites visible from the terminal and antenna system, means for focusing quasi-plane waves received from or transmitted to a chosen visible satellite towards a focal surface S, primary sources (23, 24) for transmitting and receiving signals in the form of quasi-spherical wave beams, mobile independently over the sphere S in a manner that is slaved to the particular position of the non-geostationary satellites.

29 Claims, 7 Drawing Sheets

OTHER PUBLICATIONS

Leke, Cioffi: "Effects on channel estimations errors on discrete multitone modulation (DMT) Systems in a Rayleighfading environment" Asilomar conference on Signals, Systems and Computers, Nov. 2–5, 1997, pp. 595–599, XP0002135367.

* cited by examiner

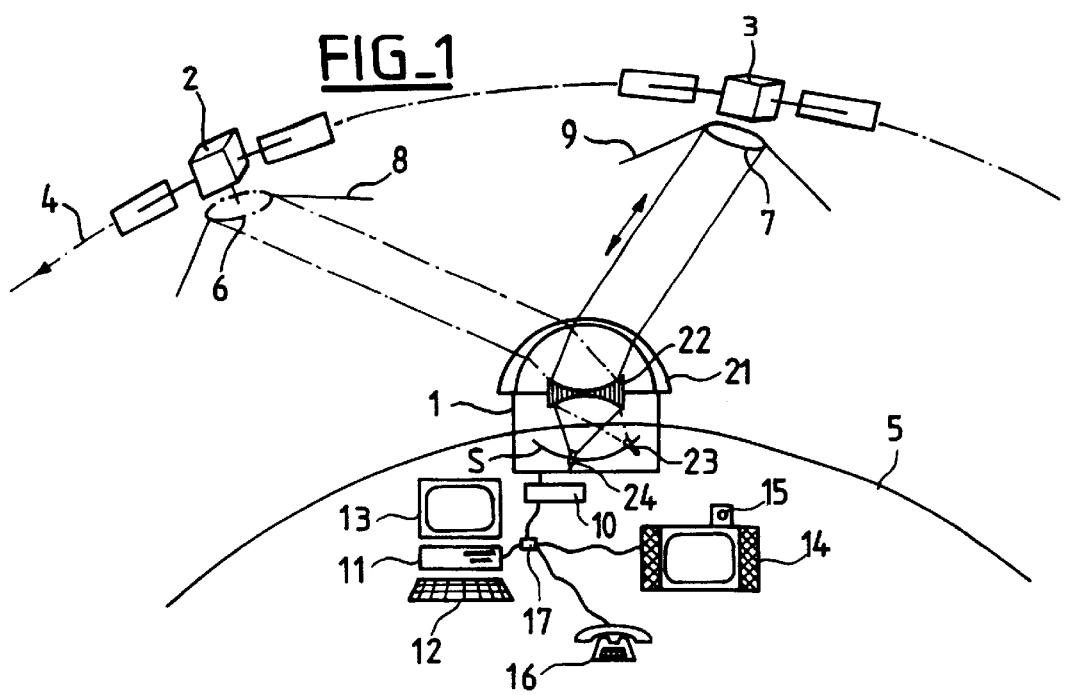
FIG_1
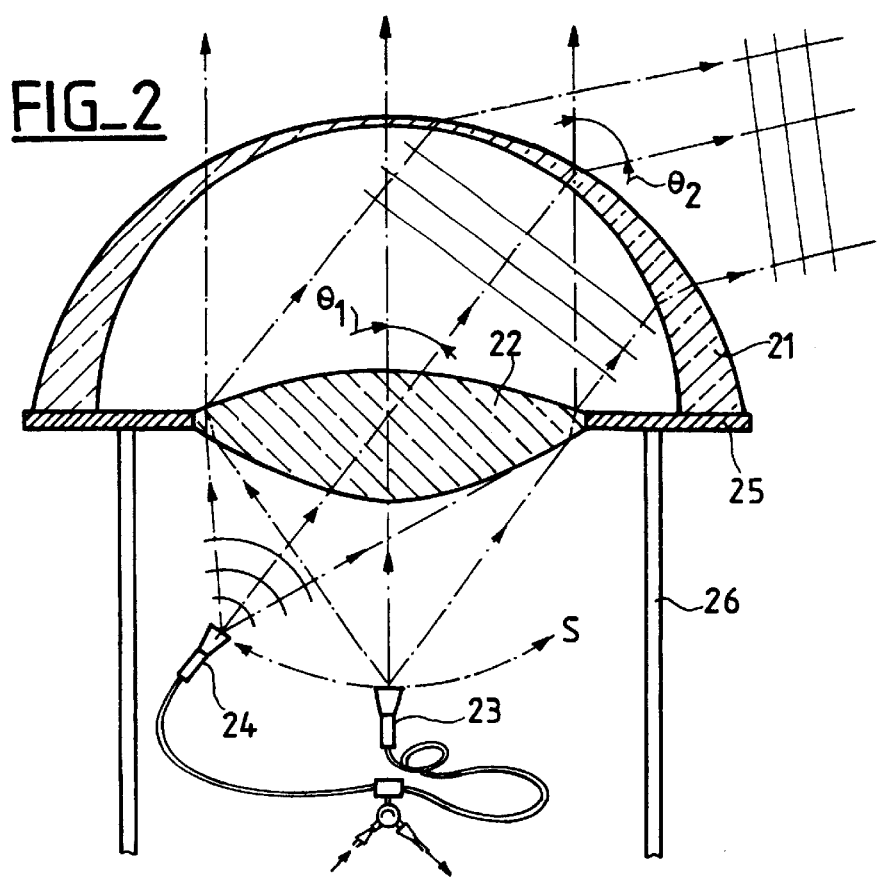
FIG_2

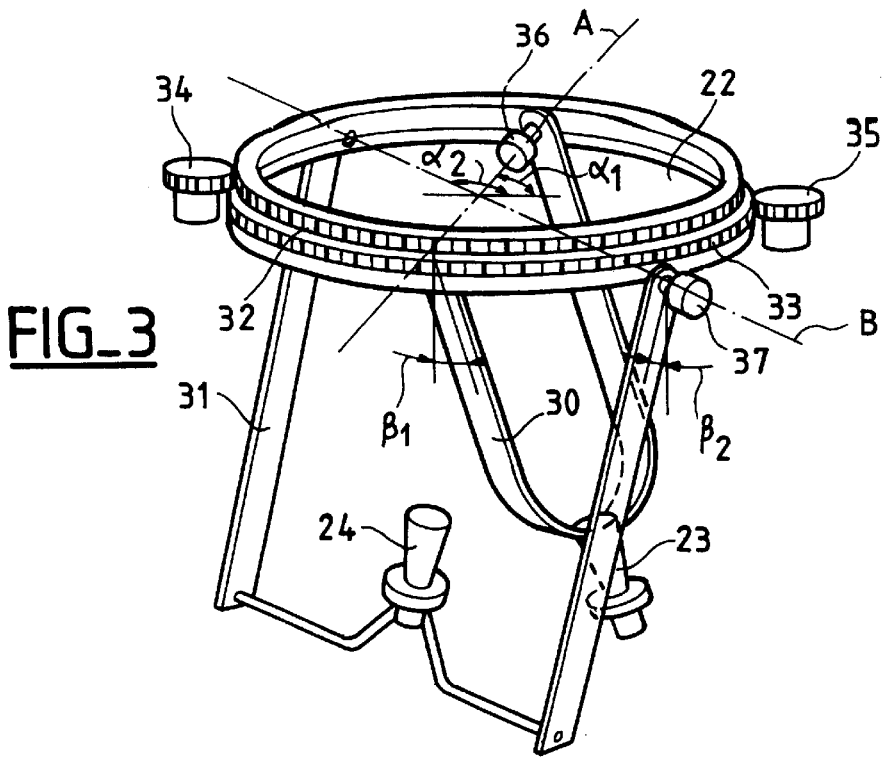
FIG_3
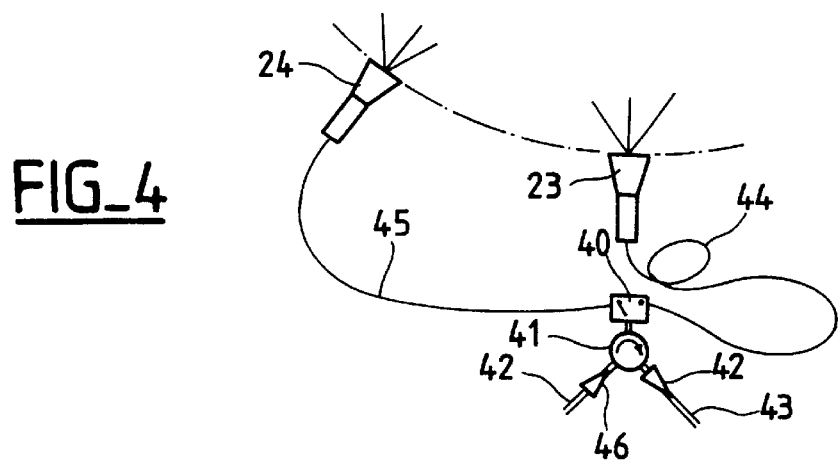
FIG_4
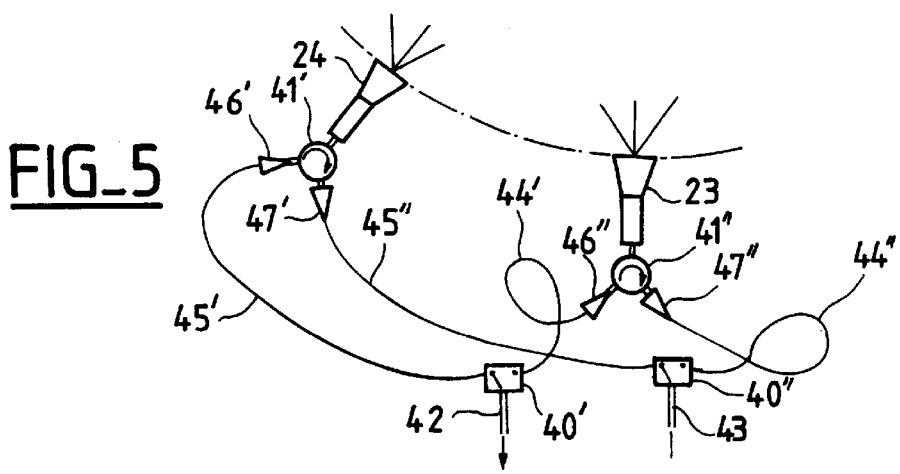
FIG_5

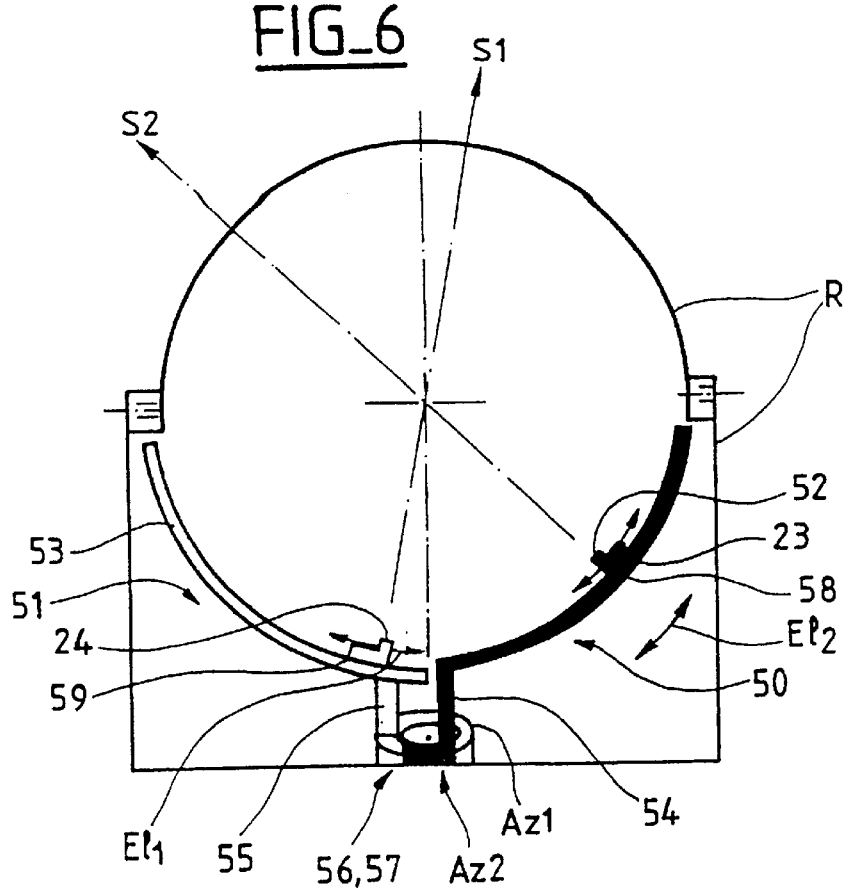
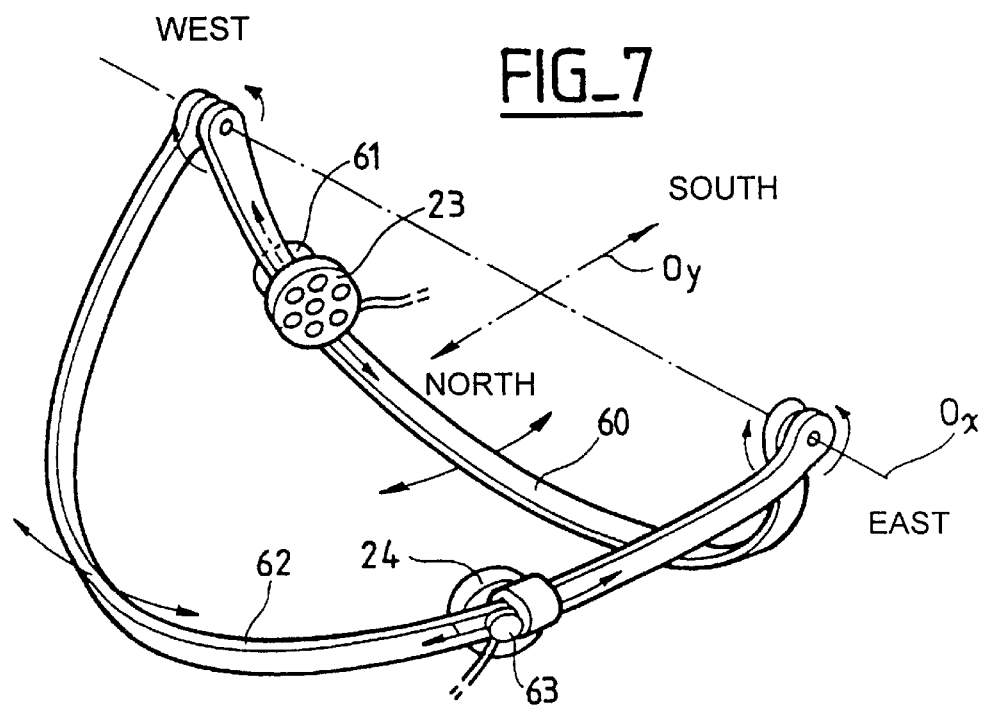

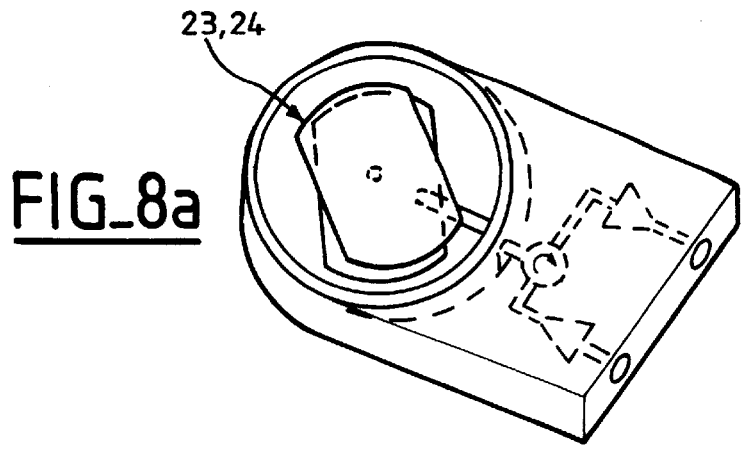
FIG_8a
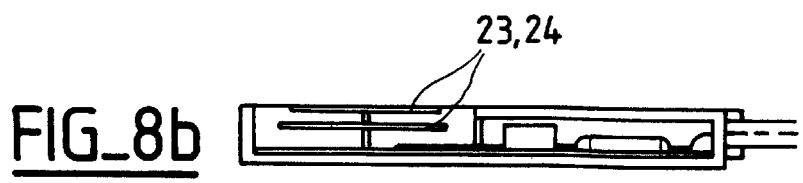
FIG_8b
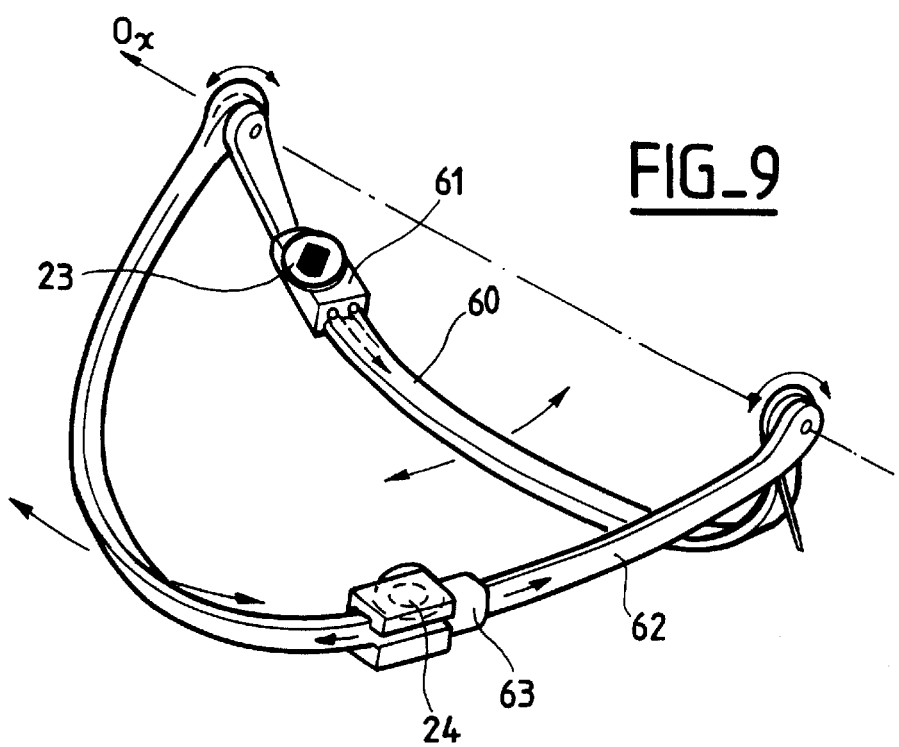
FIG_9

FIG_10
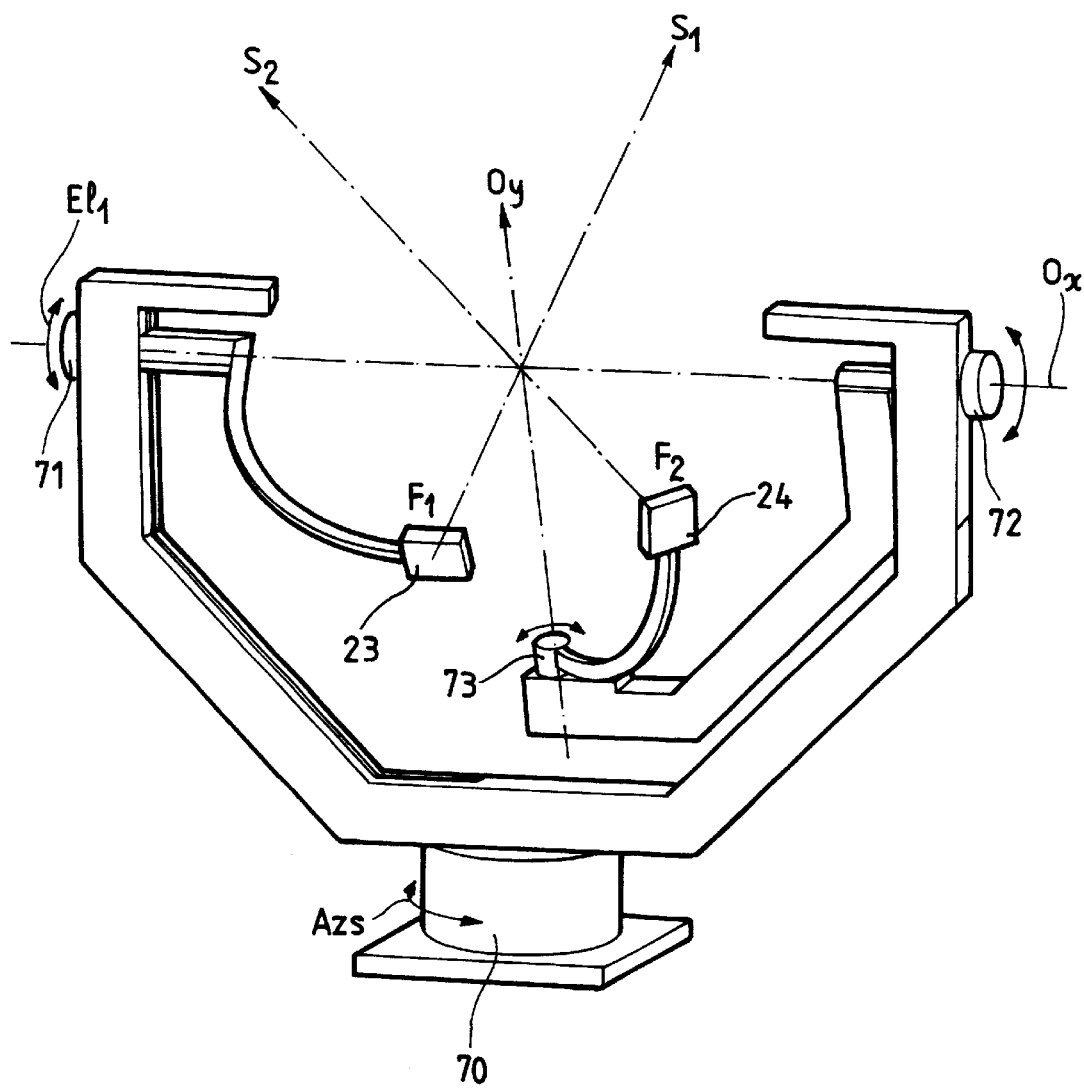

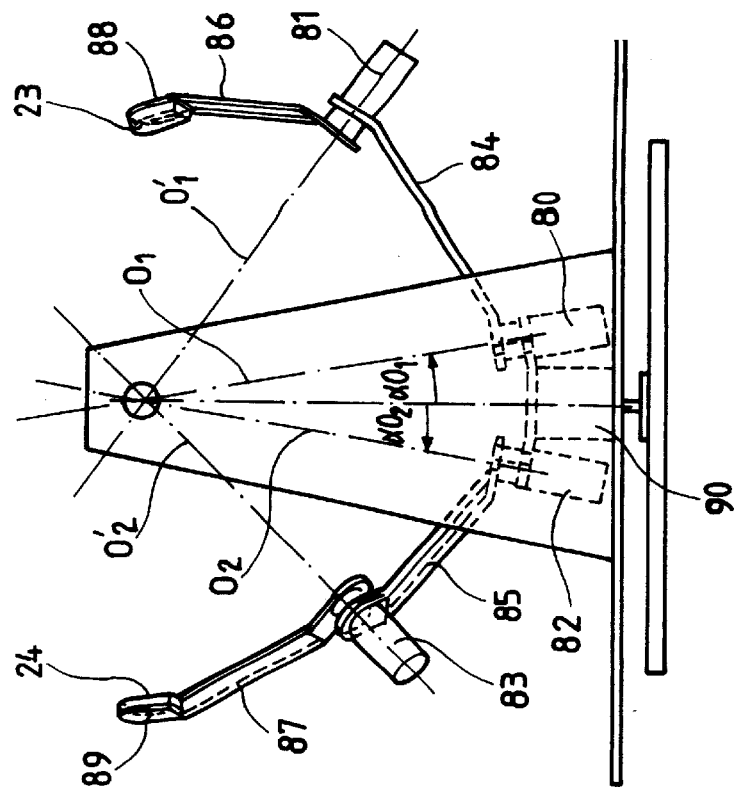
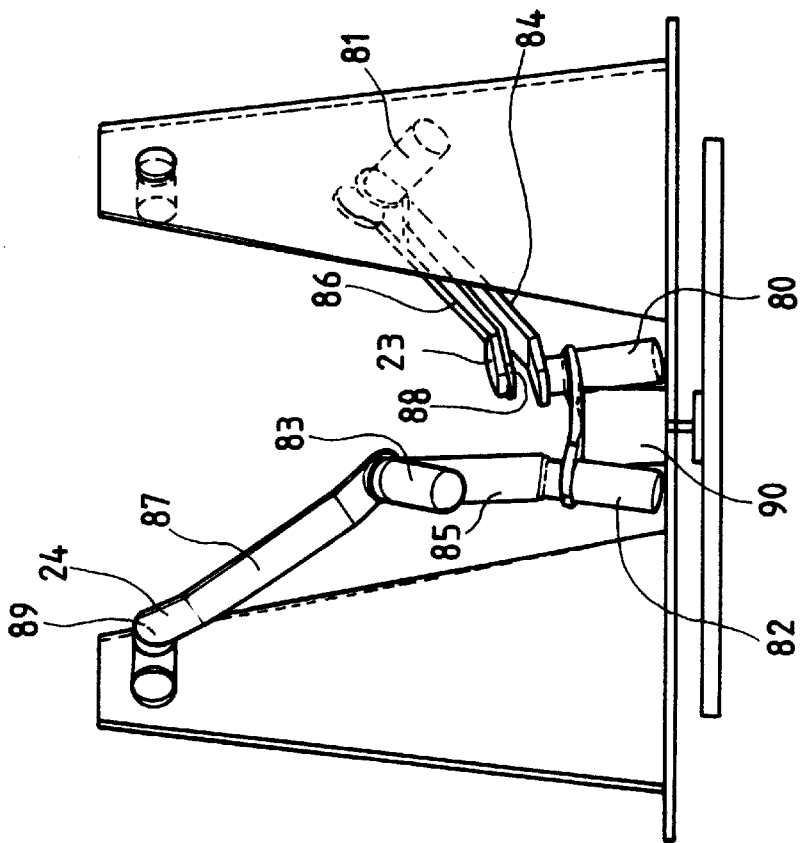

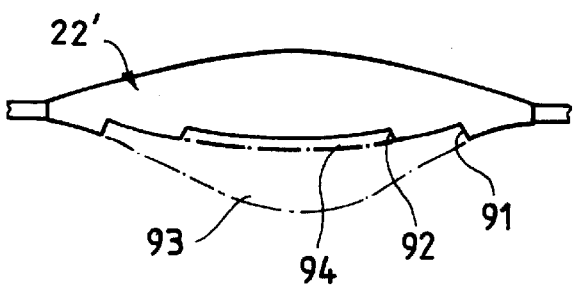
FIG_13
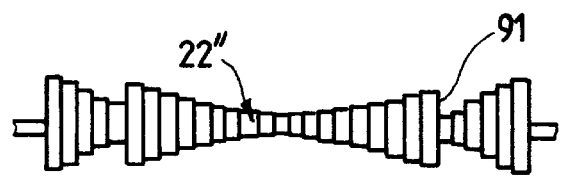
FIG_14
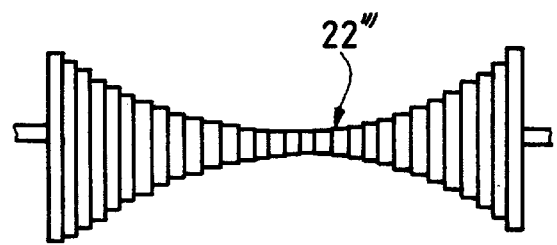
FIG_15
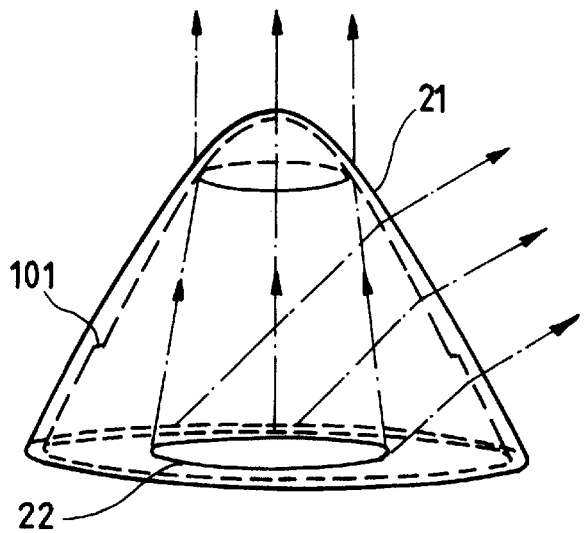
FIG_16

TERMINAL-ANTENNA DEVICE FOR MOVING SATELLITE CONSTELLATION

BACKGROUND OF THE INVENTION

The invention concerns a terminal and antenna system for transmitting and receiving data to and from non-geostationary satellites in low Earth orbit.

The terminal and antenna system is designed to be inserted into a system for transmitting data at high bit rates to and from a constellation of satellites for public or private, civil or military use.

A constellation of this kind comprises a large number of non-geostationary satellites in low or medium orbit around the Earth. In a standard configuration, the altitude is in the range from 800 km to 1500 km and the satellites are regularly spaced in a series of orbital planes, with eight satellites at 45° from each other, for example, in each of eight steeply inclined orbital planes around the Earth, so that any point on the globe is at all times in view of at least two if not three satellites. The choice of a low orbit for the satellites is motivated by the requirement for a high level of interactivity with a station centralizing access to networks, at high data bit rates and therefore with receivers that receive a high power level, which is not compatible with the propagation time via the geostationary orbit. However, this choice leads to fast movement of the satellites across the sky, a satellite in a 1500 km orbit remaining in view from a point on the ground for about 10 minutes only.

To reduce the number of satellites assuring continuity of calls with terminals on the ground, it is necessary for the terminals to be able to track the satellite for as long as possible, and therefore as far as possible towards the horizon. A second condition for these terminals is that they must be able to switch the stream of calls very quickly from a satellite reaching the horizon to a more visible satellite. Finally, the gain of the antenna must be in the order of 30 dBi for the transmit and receive beams.

Solutions to this problem have been proposed. A first solution uses an electronically scanned antenna, but the angular range to be covered is very wide (0° to 360° in azimuth, 10° to 90° in elevation), in which case this solution implies a prohibitive number of active elements: phase-shifters, low-noise receive amplifiers and transmit power amplifiers between the radiating elements and the phase-shifters to compensate for their losses and those of the splitters/combiners. Their cost is therefore much too high.

Another solution, originating in the military field, and for tracking a plurality of moving, over-the-horizon targets is disclosed in U.S. Pat. No. 3,755,815 and described in Microwave Journal (Oct. 75, pp. 31–34). It uses an array of active transmitter elements associated with a dome lens of dielectric material for deflecting the beam to the horizon and beyond. That solution has the major drawback of very high manufacturing cost because it requires an array of several hundred active elements.

There are other means for deflecting radio beams by using dielectric or waveguide lenses, for example as described by Lo and Lee in "Antenna Handbook", but their technology restricts them to small deflection angles, of approximately 10° about the axis of the lens, and with no target tracking capability.

In the field of microwave antennas, the literature (see for example PCT WO 88/09066) describes antennas incorporating a plane array antenna associated with a focusing microwave lens and a horn source that can be positioned on a portion of a focal sphere depending on the direction required of the beam. Those antennas have the drawback that the radiating surface is a plane array so the directivity of the antenna falls off drastically at low elevations (approximately −7.6 dB for an elevation of 10°), whereas here the requirement is for constant directivity.

SUMMARY OF THE INVENTION

The invention is therefore aimed at a simple, compact system that is cheap to manufacture and that maintains calls at a high bit rate to and from a constellation of non-geostationary satellites.

To this end the invention proposes an antenna system for transmitting and receiving radio signals to and from a remote transceiver system moving in the space visible from said antenna, including a lens for focusing quasi-plane waves emitted by said remote transceiver, said means having a focal sphere S, at least one primary source for transmitting and receiving signals in the form of quasi-spherical wave beams, which source is mobile on a portion of the sphere S, characterized in that it includes in combination:

a) a lens for deflecting the quasi-plane waves transmitted or received by the remote transceiver, and b) means for slaving the position of each primary transmit/receive source to the known position of a remote transceiver.

The above combination of a focusing lens and a deflector lens produces a plane wave beam and deflects the beam practically to the horizon, the beam being emitted or picked up by a primary transmit/receive source disposed at a point on the focal sphere of the focusing lens corresponding to the position of the satellite at any given time.

The invention is aimed more particularly at a terminal and antenna system for transmitting and receiving radio signals to and from at least two remote transceiver systems at different points in the space visible from said terminal and antenna system, characterized in that it includes:

a) means for determining the position of said remote transceivers in view at a given time, b) means for choosing a remote transceiver, c) an antenna according to the above description, including at least two primary transmit/receive sources, d) means for controlling movement of the primary transmit/receive sources over the focal sphere S adapted to prevent the primary sources colliding, and e) means for switching between the primary sources.

Transfer of data with a constellation of non-geostationary satellites is therefore maintained continuously in this case. Reducing the number of primary transmit/receive sources to just two significantly reduces the overall cost of the antenna. Also, the system in this configuration is significantly smaller than the solution employing two Cassegrain antennas. A tool is therefore obtained which is much simpler than previous systems, can be installed on the roof of a house in the conventional way, and has a low manufacturing cost, making this type of antenna available to private individuals.

In one particular embodiment of the invention, the primary transmit/receive sources of signals in the form of quasi-spherical wave beams take the form of horn antennas which can be moved over a portion of the focal sphere of the focusing lens.

In a preferred embodiment of the invention, each primary transmit/receive source is moved by a pair of azimuth and inclination motors.

These features contribute to a low cost of manufacture through using standard components and a simple mechanical assembly.

In a preferred embodiment of the invention, the lens for focusing quasi-plane waves into quasi-spherical waves is a multi-focal convergent lens having a large scanning range.

More particularly, the scanning range is made to be greater than 30° relative to the axis of symmetry of revolution of the focusing lens by moving the primary transmit/receive wave sources over its focal sphere.

This feature makes it possible to achieve a wide scanning range with simple technology.

In a preferred embodiment of the invention, the focusing lens is a convex dielectric lens. In an advantageous embodiment of the invention, the focusing lens is a concave waveguide lens.

The above embodiments of the focusing lens based on cheap standard materials further reduce the cost of the system compared with the arrays of active components used in some prior art solutions.

In a preferred embodiment of the invention the lens for deflecting the quasi-plane waves is a dielectric dome lens. To be more precise, the dome lens has a generally hemispherical overall profile.

This embodiment of the lens can deflect beams practically to the horizon and it also provides a protective radome for the antenna.

In a preferred embodiment of the invention, at least one of the lenses incorporates a matching layer corresponding to a quarter-wavelength. The matching layer is preferably made up of a dielectric material having an index equal to the square root of the index of the dielectric material of the lens. In an advantageous embodiment of the invention the thickness of the matching layer is equal to one quarter of the wavelength used and the matching layer is pierced with a plurality of blind holes.

The matching layer reduces losses and coupling effects generated by reflection at the surface of the dielectric lenses.

BRIEF DESCRIPTION OF THE DRAWINGS

The following description and the drawings of a preferred embodiment of the invention further explain the objects and advantages of the invention. Clearly the description is given by way of non-limiting example only. In the figures:

FIG. 1 is a diagram showing a terminal and antenna system of the invention and the components of a satellite data transmission system into which it is integrated, FIG. 2 shows the main components of an antenna of the invention in more detail, FIG. 3 is a diagram showing an embodiment of a mechanical system for displacing the primary transmit/receive sources over a portion of the focal sphere S of the focusing lens using pairs of azimuth and elevation motors, FIG. 4 shows a preferred form of the electronics for switching the signals of the primary transmit/receive sources, FIG. 5 shows a variant of the same electronics, FIG. 6 is a diagram showing a second embodiment of a mechanical system for moving the primary transmit/receive sources over a portion of the focal sphere of the focusing lens using pairs of azimuth and elevation motors, FIG. 7 is a diagram showing one embodiment of a mechanical system for moving the primary transmit/receive sources over a portion of the focal sphere of the focusing lens using pairs of X and Y motors, FIG. 8 is a diagram showing one embodiment of the primary transmit/receive sources in perspective (FIG. 8a) and in section (FIG. 8b), FIG. 9 shows the mechanism from FIG. 6 with primary transmit/receive sources of the kind shown in FIG. 8 mounted on it, FIG. 10 is a diagram showing one embodiment of a mechanical system for moving the primary transmit/receive sources over a portion of the focal sphere of the focusing lens using pairs of azimuth and elevation motors and pairs of X and Y motors, FIG. 11 is a diagram showing one embodiment of a mechanical system for moving the primary transmit/receive sources over a portion of the focal sphere of the focusing lens using pairs of motors with oblique axes, only one source being active, FIG. 12 shows a variant of the FIG. 11 embodiment in which two sources are active, FIGS. 13 through 15 are sectional views of three variants of the focusing lens, and FIG. 16 is a diagram showing a hyperboloid variant of the deflecting lens.

DETAILED DESCRIPTION OF THE INVENTION

FIG. 1 shows an antenna 1 which can be seen from two satellites 2, 3 traveling in an orbit 4 around the Earth 5. The orbits of the satellites are deterministic and known long in advance. However, the satellites are subject to drift (limited to approximately ±0.5°) associated with residual atmospheric drag, the pressure of solar radiation and attitude control maneuvers. This drift is corrected at regular intervals by the thrusters of the satellite. The satellites carry receive and transmit antennas 6, 7 transmitting high-power signals in directional beams 8, 9.

A private individual or a business using the data transmission system is provided with a terminal and antenna system including an antenna 1 fixedly installed on the roof, like a standard satellite TV antenna, for example. The terminal and antenna system includes control electronics 10 for tracking satellites, transmitting and receiving radio signals and decoding encrypted information for which the user holds an authorization (subscription). The terminal and antenna system is also connected to a personal microcomputer (PC) 11 including a memory system, not shown, a keyboard 12, and a screen 13. The memory system of the microcomputer stores information characterizing the orbits of the satellites (ephemeris) and software for calculating which satellites are in view and at which local geographical angles (azimuth, elevation) at any time, on the basis of the above orbital information and of the geographical location (longitude and latitude) of the terminal and antenna system.

The terminal and antenna system 1, 10 in this embodiment is also connected to a television 14 for receiving broadcasts on command, and the television can be equipped with a camera 15 for videoconferencing applications, a telephone 16 and a facsimile machine, not shown. The various systems requiring to transfer data via the terminal and antenna system are connected to a connecting box 17 which could be integrated into the unit 10 containing the control electronics for the terminal and antenna system.

The antenna 1 of the invention is shown in more detail in FIG. 2 and, in a preferred embodiment, includes a dome lens 21 for deflecting radio beams from a satellite anywhere in locally visible space, from the zenith and practically to the horizon, to a focusing lens 22 which transforms plane waves received from the satellite into spherical waves (and vice versa). The antenna 1 also includes two primary sources 23, 24 for transmitting and receiving spherical wave beams, a mechanical assembly, not shown in this figure, for positioning the primary transmit/receive sources, and a mechanical structure 25 to support these components. The system under the primary sources and the lenses is incorporated in a protective metal cylinder 26.

The deflector dome lens 21 is well known to the person skilled in the art. To a first approximation it behaves like an optical lens for microwaves. Its function is to deflect quasi-plane wave beams inclined at an angle $\Theta2$ in the range from 0° to 80° to 85° into the form of a quasi-plane wave beam inclined at an angle $\Theta1$ in the range from 0° to 30° or 40°.

Its shape is quasi-hemispherical. The theory of dome lenses of this kind is described in "Microwave Journal"October 1975. It is molded out of a microwave dielectric material, for example a thermosetting material having a high capacity for deflecting radio waves (dielectric permittivity $\epsilon$ close to 10). These materials include thermoset Microwave Material TMM 10 from the "Duroids™" family manufactured by Rogers Corp or the K10 material from Emerson & Cummings. These materials are based on a matrix of PTFE (Polytetrafluoroethylene, more widely known by the registered trademark Teflon™) including fine ceramic particles, and they are virtually totally resistant to rain and inclement weather and sufficiently rigid not to be deformed by wind. They can therefore function as a radome protecting the antenna assembly.

Their shape must be accurate to within one millimeter, given the wavelength chosen (a few centimeters), which makes them simple to fabricate because this is relatively undemanding in terms of accuracy (this accuracy is much lower than is required for camera lenses).

The high deflecting power chosen multiplies the scanning angle by a factor in the range from 2 to 2.7 and so scanning is possible practically to the horizon with internal beam angles of only 30° to 40°. Greater deflecting power would cause partial reflection of the signals at the surface, which would degrade the performance of the antenna system as a whole. The inside radius of the hemispherical lens is 25 cm and its thickness varies from approximately 3 mm to 5 mm at the summit to 3 cm to 7 cm at the rim, depending on the index of the chosen material. The exterior profile of the dome lens is also close to that of a spherical dome. In the embodiment described here, the radome therefore has an outside diameter of approximately 60 cm, which is comparable with the size of parabolic satellite TV receiver antennas.

The focusing lens 22 is also a dielectric material microwave lens. To a first approximation it behaves like a quasi-optical lens, with an index greater than 1 (the wavelength in the dielectric being less than the wavelength in a vacuum). The geometry of such lenses is therefore convex and is described by Lo and Lee in "Antenna Handbook", for example on pages 16–19 through 16–59. The function of the lens is to transform a quasi-plane wave beam inclined at an angle in the range from 0° to 35° into a similarly inclined quasi-spherical wave beam.

The multifocal lens produces a wide scanning angle (30° to 40° about the axis of the lens) by moving the primary (transmit and receive) source. The literature describes lenses of this type for a scanning angle in the order of 10°, with a very narrow beam, but extrapolation to an angle in the range from 30° to 40° does not give rise to any particular problem, given that the gain of the focusing antenna does not need to be high in this application, its beam being much wider, and the skilled person being well aware that the scanning range of a focusing system is expressed as a number of beam widths. Once again, a lens of this kind is easily obtained by molding a composite material having a high dielectric constant ($\epsilon$ close to 10). For the same reason as previously (i.e. because the wavelength used is a few centimeters), the required accuracy of molding is only in the order of one millimeter (proportional to the wavelength, which is much longer than for lenses used in the visible spectrum). The composite materials described above for making the dome lens 21 are also used to make the focusing lens 22. The choice of a dielectric lens gives the antenna a large bandwidth and it can therefore handle data at a high bit rate.

The diameter of the focusing lens is approximately 35 cm for an inside diameter of the dome lens of 50 cm. The focusing lens is horizontal with its optical center coinciding with that of the hemispherical dome lens. The radius of the focal sphere of the lens is approximately 30 cm to 50 cm, depending on the precise characteristics of the chosen materials.

Mobile primary sources 23, 24 for transmitting and receiving spherical waves are disposed on a portion of the focal sphere (typically 35° about the axis of the focusing lens). They are standard horn antennas for satellite TV reception, for example, which use horns illuminated by parabolic reflectors.

The specific characteristics of the horns employed here are related to the angle within which they see the focusing lens and to the wavelength employed. With regard to the data bit rates, for varied applications including interactive games, teleworking, teleteaching, interactive video and Internet type transmission of data it is necessary to consider a maximum transmitted volume in the order of 1 to 5 Mbps and a maximum received volume one order of magnitude greater, i.e. from 10 to 50 Mbps. Also, the position of the horns in this application leads to a beam aperture of ±30°. Accepting −10 dB to −15 dB attenuation at the beam edges, a standard calculation yields a horn mouth diameter of 50 mm to 60 mm for the frequency band employed (Ku band from 11 GHz to 14.3 GHz).

FIG. 3 shows a simple mechanical assembly whose function is to move two horns independently of each other over a portion of a sphere. The assembly primarily includes a double concentric ring 32, 33 and swings 30, 31 supporting the horns 23, 24. To ensure that the sphere portion determined by the axis of freedom of the horns in this configuration corresponds to the focal sphere of the focusing lens 22, the lens is disposed at the center of the double ring by standard mechanical support means, not shown here.

In this configuration, the first horn 23 is moved by an assembly "inside" the assembly supporting the other horn 24. The top of the first horn 23 is attached to a rigid plastics material swing type support structure 30 with two arms of circular arc shape in the lower part to avoid impeding the movement of the other swing 31 supporting the second horn 24. The swing 30 is attached to an inner ring 32 about an axis A.

The swing is moved about the vertical axis by an inclination motor 36, for example an electrical stepper motor disposed on the axis A inside the ring 32. This movement produces an inclination $\beta1$ in the range from −35° to +35°. This inclination is a function of the elevation of the satellite: it is zero for a satellite at the zenith of the location and ±35° for a satellite 10° above the horizon of the location.

The inner ring 32 is rotated by another electric stepper motor 34 providing an azimuth angle $\alpha1$ in the range from 0° to 360°. This motor is outside the two rings, for example, and rotates the inner ring via a toothed ring.

Clearly the combined action of the azimuth motor 34 and the inclination motor 36 can place the first horn 23 at any chosen point on a dome of the focal sphere within an aperture angle of ±35°, the horn pointing towards the center of the focusing lens at all times. The two motors 34 and 36 are controlled to track a non-geostationary satellite, the speed of the satellite corresponding to movement of the horn from a −35° elevation position to a +35° elevation position in approximately ten minutes, for example.

The azimuth motor 34 and the inclination motor 36 therefore constitute a pair of azimuth and elevation motors.

The arrangement for the second horn is very similar to that described above for the first horn. The bottom part of the horn 24 is attached to a swing structure 31 whose size is such that it does not impede the movement of the inner swing. This swing is suspended from an outer swing 33. The azimuth angle $\alpha 2$ of the antenna 24 is determined by an azimuth motor 37 and the inclination angle $\beta 2$ by an inclination motor 35 in all respects identical to the positioning motors of the other antenna.

The control and power supply electronics of the azimuth and inclination stepper motors of the horns is not described here but will be clear to the person skilled in the art.

FIG. 4 shows the electronics for switching between the two horns 23, 24. A transmit signal channel 42 includes a Solid State Power Amplifier (SSPA) 46 and a receive signal channel 43 includes a Low-Noise Amplifier (LNA) 47. The two channels are connected to a circulator 41. The circulator is a standard passive component circulating the signal in a given direction between its three ports and providing transmit/receive decoupling. It is made of ferrite, for example. The circulator 41 is connected to a switch 40 for selectively connecting one or other of the horns. The switch 40 is connected to the horns by flexible coaxial cables 44, 45. It is a standard diode-based switch and switches between the two horns in less than one microsecond. Ancillary components not mentioned in this description, such as the electrical power supply, are standard in the art.

The operation of the system proceeds in a number of stages. The first stage is installation of the system. This includes the mechanical fixing of the antenna to the roof of a building and verifying the horizontal axes and the north/south orientation of the antenna. The antenna is then connected to its power supply, to a control microcomputer 11 and to user systems in the form of a TV 14, a camera 15 and a telephone 16.

During this same stage the ephemeris (orbital position and speed parameters at a given initial time) of each satellite of the constellation is entered into the memory of the host computer controlling the antenna. This data can be supplied on diskette.

After the local time and the terrestrial position (latitude, longitude) of the terminal and antenna system have been entered, the computer can calculate the current position of the satellites of the constellation depending on the time that has elapsed since the time corresponding to the stored orbital parameters and can compare those positions to the theoretical area of visibility from the terminal and antenna system. The system can be calibrated automatically, including pointing the two horns 23, 24 at the theoretical positions of the satellites in view, tracking them briefly and verifying from the data acquired the power level received and transmitted, the spatial orientation of the antenna, and the quality of tracking. A diagnosis of corrections required to the installation is produced automatically from this calibration data.

During routine use, when the user starts up the system (by booting up the computer and powering up the antenna), the control software calculates the position of the satellites at that time and determines which satellites are in view at that time from its location. From the coordinates of the satellite that is the highest above the horizon, the computer 11 calculates the corresponding position required for a horn on the focal sphere of the focusing lens, sends instructions to the stepper motors which move that horn and selectively connects the horn, corresponding to the most visible satellite, to the transmit and receive electronics. It is then possible to transmit and receive data.

The computer then continuously calculates corrections to the position of the horn to track the satellite and drives the positioning motors accordingly. The accuracy of positioning required for regular tracking of the satellites is determined by the width of the main lobe of the antenna and the amount of signal attenuation that can be accepted before the antenna is moved. In the present example, a lobe aperture of 5° and an acceptable signal loss of 0.3 dB lead to an accuracy of 0.75° for pointing of the horn by the motors, which for a focal sphere having a radius of 50 cm corresponds to a positioning accuracy of 0.65 cm. Tracking a satellite in low Earth orbit therefore requires the horn to be moved 0.65 cm approximately every 6 seconds. When tracking a satellite, movement of the horn conveying the stream of calls has a higher priority than movement of the other horn, the software ensuring at all times that no collisions occur by moving the second horn out of the path of the first one if necessary.

The computer determines the second most visible satellite on the basis of criteria such as a satellite elevation of less than 10° (satellite approaching the horizon) or an abnormal drop in the level of the received signal (allowing for trees, hills and other local, permanent or temporary obstacles, or entry into the band near the geostationary arc, in which interference to or from geostationary satellites makes it obligatory to cut off the link), and positions the second horn in a manner corresponding to that position. The second horn is then selectively connected and the satellite is tracked. The time to switch between the two horn antennas, which is 1 microsecond in the embodiment described, leads to a maximum loss of data of approximately 1 to 50 bits for a maximum transmitted data bit rate of 1 to 50 Mbps. Lost data is reconstituted using error correcting codes transmitted with the signal.

The ephemeris can be updated with new data from diskette or downloaded from the satellite network itself, in response to an automatic request from the terminal.

As indicated in the foregoing description, the motors used in this assembly have a power rating suited to moving a small mass, less than 1 kg, which makes it possible to use low-cost motors that are available off the shelf. This is an advantage compared to the satellite tracking solution using two Cassegrain antennas, for which the motors must be able to position accurately masses of a few kg, and are therefore more costly.

A standard mechanical assembly and simple electronics can guarantee the levels of accuracy required in positioning the antenna and the time between two movements. The chosen solution is therefore clearly economic to manufacture.

The embodiment of the invention described provides a compact low-cost system, the various components being standard components or having undemanding manufacturing specifications.

Note that the system described exhibits symmetry of revolution about its vertical axis, with a windage such that the wind direction is immaterial and a low drag coefficient because of the choice of cylindrical and hemispherical geometries, which has advantage over standard antennas with no radome, which causes problems of movement due to gusts of wind.

A different embodiment of the focusing lens 22 is made of silica quartz material.

In a further embodiment, the electronics for switching between the two horns 23, 24 are replaced by the system shown in FIG. 5. In this system, each horn 23, 24 has a circulator 41', 41" to which the transmit signal amplification modules 46', 46" and the receive signal amplification modules 47', 47" are connected directly. The transmit signal amplifiers of the two primary sources are connected by two coaxial cables 45', 44' to a selective connection system 40' which receives the signals to be transmitted via a channel 42. Similarly, the receive signal low-noise amplifiers are connected by coaxial cables 45", 44" to a selective connection system 40" connected to a receive signal channel 43.

This arrangement is intended to reduce the impact of signal losses occurring in the flexible coaxial cables and estimated at 1 dB in each cable of approximately 0.5 m length. This embodiment has a higher cost because of the duplication of the amplifiers, but for the same amplifier power it increases the Equivalent Isotropically Radiated Power (EIRP) by approximately 1 dB and the received figure of merit (G/T) by approximately 2 dB. For equal antenna performance, this enables the dimensions of the focusing lens and the dome lens, and therefore the entire antenna, to be reduced.

FIG. 6 shows a variant of the mechanical assembly with azimuth and elevation motors from FIG. 3. Each source 23, 24 is mounted on a support arm 50, 51 including a circular arc 52, 53 concentric with the focal sphere S respectively positioned on one half of the lower part of the focal sphere and a rotation drive shaft 54, 55 parallel to the vertical axis and coupled to an azimuth motor 56, 57. In this way the primary sources 23, 24 can move along respective separate azimuths Az1 and Az2.

Each primary source 23, 24 is guided along its circular arc 52, 53 in a slideway for movement in elevation El1, El2 by elevation motors 58, 59. The elevation movements El1 and El2 define the sighting axes S1 and S2 of the two visible satellites.

In a variant of the method of tracking satellites, an active technique replaces the passive technique described above, in which the data characterizing the position of the satellites is merely pre-stored in the memory of the computer and it is assumed that the primary sources are positioned in this way at the correct location and at the correct time, with no real-time control. In this variant, each horn includes a plurality of receivers, for example four receivers in a square matrix, and supplies output signals corresponding to a sum and a difference of the signals received by the various receivers. At the start of tracking a given satellite, one horn is positioned in accordance with the data calculated by the computer 11. Analyzing the way the sum and difference signals vary over time then indicates the direction in which the satellite is moving so that it can be tracked accordingly. The host computer can regularly and automatically update the stored ephemeris as a function of the positions of the satellites as really observed.

In another variant that is not shown, in which the user has no microcomputer, the satellite tracking software and the memory for storing the ephemeris are integrated into a microprocessor with memory, for example in a TV set-top box of a size typical of standard encrypted TV set-top decoders, and which can be combined with a modulator/demodulator for encrypted transmission. A procedure is then provided for automatically downloading the ephemeris at regular intervals, without requiring user intervention.

Note that in all the previous embodiments, if the operating band of the multimedia system is the same as that of direct broadcast TV satellites, the two sources can be placed at positions suitable for aiming at two geostationary satellites: the same terminal and antenna system is then used alternately for the multimedia application and for receiving broadcasts from two satellites, which can be changed at will by moving the sources.

In a further embodiment, a system similar to that of the invention is installed not as part of a terminal on the ground but on a satellite, for example a remote Earth-sensing satellite which has to transmit images to only a few ground stations which can occupy any position. The principle of tracking ground stations from the satellite is analogous to that of tracking satellites from a ground terminal. In this application, the size of the ground stations can be very much smaller (for example by a factor of 10 if a 20 dB gain is applied to the signal received by the antenna), compared to standard receive antennas for satellites transmitting a broad beam, where the received power is low. This arrangement can also enhance the confidentiality of the transmitted data. Finally, the simplicity of the solution, its low cost (in particular compared to active antennas with very large numbers of elements) and its low electrical power consumption make its implementation on a satellite particularly beneficial.

The scope of the present invention is not limited to the details of the embodiments described above by way of example, but to the contrary encompasses modifications that will suggest themselves to the person skilled in the art.

In another variant of the mechanical assembly supporting the mobile sources, shown in FIG. 7, each primary source 23, 24 is moved by a pair of X and Y motors. A semi-circular arc 60 is attached at two directly opposite points of the focal sphere, for example its East and West points. One source 23 is moved along this arc, providing a slideway, by a secondary electric motor 61 attached to the source. The second source 24 is identically mounted on another arc 62 and is moved by a secondary motor 63. Although this feature is not shown, each semi-circular arc 60 and 62 is rotated about its primary axis Ox by a primary motor constituting the second motor of the pair of X and Y motors, the circular arc 60 having a smaller radius than the circular arc 62. The secondary motors 61 and 63 therefore move the sources about a secondary axis Oy which is itself moved relative to the primary axis by the primary motors, the secondary axis Oy being always orthogonal to the primary axis Ox. In order to avoid conflicts between the positions of the sources one of the sources transmits to and receives from the "North" satellites and the other one transmits to and receives from the "South" satellites. Relative repositioning of the two arms or arcs is possible if one passes under the lens.

The systems shown in FIGS. 6 and 7 have the advantage over the systems shown in FIGS. 3 and 5 of compactness. They are also better suited to obtaining high angles of illumination of the lens by the sources, which is necessary when using a focusing spherical lens.

In another variant of the connection of the amplifiers mounted in front of the primary sources, using a mechanical assembly of the sources as shown in FIGS. 7 and 9, each arc is a waveguide and therefore conveys the microwave signal and a standard rotary joint is mounted at the hinge of the arcs. This arrangement reduces signal losses and so the amplifiers can be at a greater distance from the primary sources.

In another variant of the mechanical support assembly for the mobile sources, shown in FIG. 10, a first primary source 23 is moved by a pair of azimuth and elevation motors 70, 71 and the second primary source 24 is moved by a pair of X and Y motors 72, 73, the azimuth motor 70 of the first primary source also driving the antenna as a whole.

In another variant of the mechanical support assembly of the mobile sources, shown in FIGS. 11 and 12, each primary source 23, 24 is moved by a pair of motors with oblique rotation axes 80, 81 and 82, 83.

Each primary source support includes an arm 84, 85 and a forearm 86, 87, the primary source 23, 24 being fixed to the free end 88, 89 of the forearm 86, 87. The first motor 80, 82 drives the arm 84, 85 in rotation about an oblique primary axis $O_1$, $O_2$ offset by a primary angle $\alpha_{01}$, $\alpha_{02}$ relative to the vertical. The second motor 81, 83 drives the forearm 86, 87 in rotation relative to the arm 84, 85 about a secondary oblique axis $O'_1$, $O'_2$ offset to the vertical by a secondary angle $\alpha'_{01}$, $\alpha'_{02}$ greater than the primary angle $\alpha_{01}$, $\alpha_{02}$. The primary and secondary axes of each motor pair are on respective opposite sides of the vertical.

The terminal, in which the focusing lens and deflecting lens assembly is mounted on a support separate from that of the primary sources, can further include an additional motor 90 for driving the support of said assembly so that it is disposed substantially parallel to the beams.

Of course, the invention is not limited to the examples described previously, but can be applied to other embodiments, such as scanning active antennas, for example, and more generally to any embodiment using one or more means equivalent to the means described to implement the same functions in order to obtain the same results, such that, for example, each primary source, mounted on a support, is moved by at least one pair of motors to obtain a displacement of each source over at least the lower half of the focal sphere.

Furthermore, in a variant of the optical components, the focusing lens and the deflecting lens are replaced by a single lens in the form of a dielectric material fixed focus spherical lens which focuses parallel microwave beams towards a focal sphere concentric with the lens. The sources of the antenna can be mounted in a mechanical system as described above and move over the focal sphere. The sources are either horns of the kind referred to above or else printed circuit "patches". There can be one patch per source (FIG. 8a, 8b) or the patches can be grouped into small arrays (FIG. 7) for compensating any deterioration of the focusing system. The variant with patches, being compact, is particularly beneficial in the case of spherical lenses where the space available for moving the sources is more restricted, especially as one aim is to limit the overall size of the terminal and antenna system.

It is also feasible to consider a system with three sources, one of which is mounted in a fixed manner on the spherical lens and points to a satellite in the geostationary arc. An arrangement like this uses a single antenna for multimedia applications at a high data bit rate via non-geostationary satellites (which require two mobile sources) or reception of direct broadcast TV pictures from a geostationary satellite (even if it uses a frequency band other than that used by the multimedia system), at the choice of the user and with no delay for repositioning the mobile sources.

Another variant replacing cables connected to the primary sources consists in using optical fibers to transmit and/or receive signals. The fibers have the advantage of flexibility in tracking movement of the source and amplifier combination. The support can itself be used as an optical conductor to transmit information on movement of the motor driving the primary source.

The system then includes a light-emitting diode for emitting light (over a bandwidth of a few hundred MHz) and a photodiode for receiving optical data. A mirror is disposed at the attachment point of the arcs to transmit light towards the optical conductor tube.

The tube can also transmit electricity for feeding the primary source, the amplifier and the motor, having two spaced conductive tracks and contactors at the level of the source to receive the electrical current.

The dielectric material focusing lens 22 can be replaced by other lenses fulfilling the same function. Examples of such variants are shown in FIGS. 13 to 16. As shown in FIG. 13, a first variant consists in "zoning" the dielectric antenna, i.e. in removing thicknesses of material so that the phase delay remains constant (to within a multiple of 360°) before and after zoning. In the figure, two edges 91, 92 corresponding to the removal of areas 93, 94 have been formed, so reducing the volume and the mass of the lens. This zoning technique has the drawback of reducing performance because of reflections at the edges of the zones, and the number of steps in the lens profile must therefore be as small as possible.

A second variant of the focusing lens, shown in FIG. 14, replaces the dielectric material with a waveguide lens 22", possibly zoned (FIG. 14 shows an antenna 22" having one step 91). These waveguide lenses are well known to the person skilled in the art. Their principle is to synthesize a lens with an index of less than 1 (because the wavelength in the waveguide is less than the wavelength in vacuum) and therefore having to have the opposite curvature to the dielectric lenses for the same focusing power. This lens is therefore a concave lens. This option has the drawback of a narrower bandwidth than a dielectric lens, but has a lower manufacturing cost, the lens being made by forming a block of aluminum with the required concavity, for example, and then drilling in this block a series of parallel holes in a staggered arrangement.

In the case of dielectric lenses, it may be necessary to reduce reflections at the dielectric/air interfaces in order to improve the performance of the antenna. A matching layer one quarter-wavelength thick can then advantageously be provided. For example, it advantageously takes the form of a dielectric coating with an index $\sqrt{n}$ equal to the square root of the index n of the dielectric. Another variant consists in drilling a plurality of blind holes to a thickness of one quarter-wavelength, their density being such that the average of the remaining dielectric index and the index of air in the holes is equivalent to the square root $\sqrt{n}$ of the index of the dielectric. This is a standard method which amounts to "simulating" a dielectric of particular permittivity.

The description refers to a deflecting lens in the form of a hemispherical dome, which is the most standard implementation. A variant consists in using a hyperboloid or paraboloid geometry with a short focal length, as shown in FIG. 16. This figure shows a deflecting lens in the form of a hyperboloid dome 21, a focusing lens 22, the dome lens here being zoned (a step 101 can be seen in the figure). This increases the surface area illuminated at high angles of inclination (low elevation of the satellite at the horizon) and therefore compensates a drop in the gain of the focusing lens under these conditions. A dome lens 35 cm to 40 cm high then provides a usable radiating surface equivalent to a 30 cm diameter disk.

What is claimed is:

1. An antenna system for transmitting and receiving radio signals to and from a remote transceiver system moving in space visible from said antenna, said antenna system comprising:
   a first lens for focusing quasi-plane waves emitted by said remote transceiver system, said lens having a focal sphere S;
   at least one primary source for transmitting and receiving signals in a form of quasi-spherical wave beams, mobile on a portion of the sphere S; and
   a second lens for deflecting the quasi-plane waves transmitted or received by the remote transceiver system,
   wherein a position of said at least one primary source for transmitting and receiving signals is assigned to a position of the remote transceiver system.

2. A terminal and antenna system for transmitting and receiving radio signals to and from at least two remote transceiver systems at different points in space visible from said terminal and antenna system, said terminal and antenna system comprising:
   a positioning system which determines position of said at least two remote transceiver systems in view at a given time;
   a selector which chooses a remote transceiver;
   an antenna system comprising:
      a first lens for focusing quasi-plane waves emitted by the remote transceiver, said lens having a focal sphere S,
      at least two primary sources for transmitting and receiving signals in a form of quasi-spherical wave beams, mobile on a portion of the sphere S, and
      a second lens for deflecting the quasi-plane waves transmitted or received by the remote transceiver;
   a controller which controls movement of the at least two primary sources for transmitting and receiving signals over the focal sphere S adapted to prevent the at least two primary sources for transmitting and receiving signals from colliding, and
   a switch for switching between the at least two primary sources for transmitting and receiving signals.

3. A system according to claim 2, further comprising a data recovery system which recovers data lost during the switching.

4. A system according to any of claims 1 or 2, wherein at least one primary source for transmitting and receiving signals is a horn antenna mobile on a portion of the focal sphere S of the first lens for focusing the quasi-spherical beams into quasi-plane beams.

5. A system according to any of claims 1 or 2, wherein at least one primary source for transmitting and receiving signals comprises a module for amplifying the transmitted and received signals.

6. A system according to any of claims 1 or 2, wherein the first lens for focusing quasi-plane waves into quasi-spherical waves is a multifocal convergent lens having a wide scanning range.

7. A system according to claim 6, wherein the scanning range is made greater than 30° relative to the axis of symmetry of revolution of the first lens by moving at least one primary source for transmitting and receiving signals over the focal sphere S.

8. A system according to claim 6, wherein the first lens is a convex dielectric lens.

9. A system according to claim 6, wherein the first lens is a concave waveguide lens.

10. A system according to claim 6, wherein the first lens is zoned.

11. A system according to claims 1 or 2, wherein the second lens for deflecting the quasi-plane waves is a dielectric dome lens.

12. A system according to claim 11, wherein the second lens has a generally hemispherical overall profile.

13. A system according to claim 11, wherein the second lens has generally parabolic, elliptical or hyperbolic inside and outside profiles.

14. A system according to claim 11, wherein the second lens increases in thickness from a summit thereof to a base thereof.

15. A system according to claims 1 or 2, wherein the second lens is disposed so as to isolate the system from the external environment.

16. A system according to claims 1 or 2, wherein at least one of the first and second lenses comprises a quarter-wave matching layer.

17. A system according to claim 16, wherein the quarter-wave matching layer comprises a dielectric material having an index equal to the square root of an index of a dielectric material of the at least one of the first and second lenses.

18. A system according to claim 16, wherein a thickness of the quarter-wave matching layer is equal to one quarter of a wavelength used and the quarter-wave matching layer is pierced with a plurality of blind holes with a density of piercing adapted to create an equivalent index equal to the square root of an index of a dielectric material of the at least one of the first and second lenses.

19. A system according to claim 2, wherein the remote transceiver systems are satellites of a constellation and the positioning system determines the position at a given time of the satellites in sight, the positioning system comprising:
   a database of orbital parameters of each of the satellites at a given time,
   a storage system which stores terrestrial position parameters for the terminal and antenna system,
   software for calculating a current position of each of the satellites from initial orbital parameters and a time which has elapsed since an initial time, and
   software for comparing an orbital position with an angular area visible from a position of the terminal and antenna system,
   wherein the database of the orbital parameters is regularly updated.

20. A system according to claims 1 or 2, wherein at least one primary source for transmitting and receiving signals comprises a detector which detects a pointing error relative to a beam received from a moving remote transceiver.

21. A system according to claims 1 or 2, wherein, to move at least one primary source for transmitting and receiving signals over at least a lower half of the focal sphere, the at least one primary source for transmitting and receiving signals is mounted on a support and is moved by at least one pair of motors.

22. A system according to claims 1 or 2, wherein an assembly comprising first and the second lenses is mounted on a support separate from at least one primary source for transmitting and receiving signals, the system further comprising a motor for driving the support of said assembly so that said assembly extends substantially parallel to the beams.

23. A system according to claims 1 or 2, wherein at least one primary source for transmitting and receiving signals is moved by a pair of azimuth and elevation motors.

24. A system according to claim 23, further comprising a support for at least one primary source for transmitting and receiving signals, said support comprises a swing on which the at least one primary source for transmitting and receiving signals is fixedly mounted, the swing being moved along an axis by an azimuth motor of the pair of motors and moved relative to a vertical by an elevation motor of the pair of motors.

25. A system according to claim 23, further comprising a support for at least one primary source for transmitting and receiving signals, said support comprises an arm forming a circular arc concentric with the focal sphere, positioned on a respective half of a lower part of the focal sphere, the arm being rendered mobile in azimuth by an azimuth motor of the pair of motors, and the at least one primary source for transmitting and receiving signals being rendered mobile along the arc by an elevation motor of the pair of motors.

26. A system according to claims 1 or 2, further comprising a pair of X and Y motors, a first motor of said pair of motors rotating at least one primary source for transmitting and receiving signals about a horizontal primary axis Ox, and a second motor of said pair of motors rotating at least one primary source for transmitting and receiving signals about a secondary axis Oy orthogonal to said primary axis at all times and moved relative to the primary axis by the first motor.

27. A system according to claim 2, further comprising:

a pair of azimuth and elevation motors; and a pair of X and Y motors, wherein a first primary source of said at least two primary sources for transmitting and receiving signals is moved by the pair of azimuth and elevation motors, and a second primary source of said at least two primary sources for transmitting and receiving signals is moved by a pair of X and Y motors, an azimuth motor of the pair of azimuth and elevation motors of the first primary source also driving the antenna as a whole.

28. A system according to claims 1 or 2, wherein at least one primary source for transmitting and receiving signals is moved by a pair of motors with oblique rotation axes.

29. A system according to claim 28, further comprising a support for at least one primary source for transmitting and receiving signals, said support comprising an arm and a forearm, wherein the at least one primary source for transmitting and receiving signals is fixed to a free end of the forearm, a first motor of the pair of motors drives the arm in rotation about an oblique primary axis of the oblique rotation axis offset with respect to a vertical at a primary angle, a second motor of the pair of motors drives the forearm in rotation relative to the arm about an oblique secondary axis of the oblique rotation axis offset with respect to the vertical at a secondary angle greater than the primary angle, and the primary and secondary axes are on respective opposite sides of the vertical.

* * * * *